United States Patent
Kodera et al.

(10) Patent No.: US 11,414,794 B2
(45) Date of Patent: *Aug. 16, 2022

(54) AIRBAG BASE FABRIC AND AIRBAG

(71) Applicant: SEIREN CO., LTD., Fukui (JP)

(72) Inventors: Shota Kodera, Fukui (JP); Tsuyoshi Houraiya, Fukui (JP)

(73) Assignee: SEIREN CO., LTD., Fukui (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/043,396

(22) PCT Filed: Mar. 26, 2019

(86) PCT No.: PCT/JP2019/012634
§ 371 (c)(1),
(2) Date: Sep. 29, 2020

(87) PCT Pub. No.: WO2019/189044
PCT Pub. Date: Oct. 3, 2019

(65) Prior Publication Data
US 2021/0140073 A1    May 13, 2021

(30) Foreign Application Priority Data
Mar. 30, 2018   (JP) .............................. JP2018-067365

(51) Int. Cl.
*D03D 1/02*    (2006.01)
*D03D 15/283*  (2021.01)
*B60R 21/235*  (2006.01)

(52) U.S. Cl.
CPC .............. *D03D 1/02* (2013.01); *B60R 21/235* (2013.01); *D03D 15/283* (2021.01);
(Continued)

(58) Field of Classification Search
CPC ............ B60R 2021/23509; B60R 2021/23542; B60R 21/235; D03D 15/283; D03D 1/02; D10B 2331/04; D10B 2505/124
See application file for complete search history.

(56) References Cited

U.S. PATENT DOCUMENTS 5,637,385 A     6/1997  Mizuki et al.
10,760,188 B2 * 9/2020  Kodera ................. B60R 21/237
(Continued)

FOREIGN PATENT DOCUMENTS

EP   3 590 773 A1   1/2020
EP   3 690 092 A1   8/2020
(Continued)

OTHER PUBLICATIONS

International Search Report, issued in PCT/JP2019/012634, PCT/ISA/210, dated Jun. 4, 2019.
(Continued)

*Primary Examiner* — Arti Singh-Pandey
(74) *Attorney, Agent, or Firm* — Birch, Stewart, Kolasch & Birch, LLP

(57) ABSTRACT

Provided is an airbag base fabric that is a woven fabric constituted by a yarn containing polyethylene terephthalate as the main raw material, the yarn constituting the woven fabric having a total fineness of 280 to 500 dtex and a single fiber fineness of 1.0 to 3.9 dtex, the woven fabric having a cover factor of 2400 to 2800, and the D-value calculated from the thickness $D_1$ of a single sheet of the base fabric and the thickness $D_{10}$ of ten sheets of the base fabric that are stacked together being 0.9 or less, where the D-value is calculated using a formula A below:

$$D=D_{10}/(D_1\times10).\qquad\text{Formula A:}$$

5 Claims, 3 Drawing Sheets

(52) U.S. Cl.
CPC ............... *B60R 2021/23509* (2013.01); *B60R 2021/23542* (2013.01); *D10B 2331/04* (2013.01); *D10B 2505/124* (2013.01)

(56) References Cited

U.S. PATENT DOCUMENTS

| | | | | |
|---|---|---|---|---|
| 2019/0218692 A1* | 7/2019 | Kodera | ................. | B60R 21/235 |
| 2020/0047704 A1* | 2/2020 | Kodera | ................. | B60R 21/237 |
| 2020/0247348 A1* | 8/2020 | Kodera | ................. | B60R 21/235 |
| 2020/0307497 A1* | 10/2020 | Kodera | ................. | D03D 13/008 |

FOREIGN PATENT DOCUMENTS

| | | | |
|---|---|---|---|
| EP | 3 690 093 A1 | 8/2020 |
| JP | 7-186858 A | 7/1995 |
| JP | 7-258940 A | 10/1995 |
| JP | 11-48893 A | 2/1999 |
| JP | 11-293541 A | 10/1999 |

OTHER PUBLICATIONS

Written Opinion of the International Searching Authority, issued in PCT/JP2019/012634, PCT/ISA/237, dated Jun. 4, 2019.
Extended European Search Report for European Application No. 19776363.4, dated Oct. 21, 2021.

\* cited by examiner

AIRBAG BASE FABRIC AND AIRBAG

TECHNICAL FIELD

The present invention relates to a woven fabric used in an airbag that is widely used as a device for occupant protection in the event of a vehicle collision, and more particularly relates to a woven fabric for use in a non-coated airbag as well as an airbag obtained using the woven fabric.

BACKGROUND ART

Airbag devices are widely provided in vehicles as safety devices for occupant protection that protect an occupant from impact when a vehicle undergoes a collision. Conventionally, woven fabrics coated with resin materials were mainly used so as to prevent a gas emitted from an inflator from leaking from inside the bag. However, airbag devices are required to be lightweight in order to meet the demand for improved fuel consumption and the like and are also required to be capable of being compactly stored in view of current trends in steering wheel designs and the like, and therefore, non-coated woven fabrics have been increasingly used.

However, there is a problem in that, compared with coated woven fabrics, when non-coated woven fabrics are used, base fabrics' surfaces and sewn portions are highly permeable to air. Also, non-coated woven fabrics are likely to fray, and are therefore not suited for cutting with a normal knife. Thus, non-coated woven fabrics need to be fusion-cut using lasers, and it is difficult to cut a plurality of base fabric sheets together at a time.

For example, Patent Literature 1 discloses a technology for obtaining a low-air-permeable woven fabric by forming a fiber structure from a composite fiber yarn obtained by spinning an island-in-sea type composite yarn, and then performing a treatment for converting the composite fiber into an ultrafine fiber. However, since the island-in-sea type composite yarn is used as the raw yarn, the cost of the raw yarn is high, and since the sea removal treatment is necessary, the production cost is also high. Furthermore, if the sea removal is insufficient, flame retardancy may be reduced, and the resulting woven fabric is not suited for a woven fabric for use in an airbag.

Patent Literature 2 discloses a base fabric that can be precisely cut over the entire width of the fabric during laser cutting, obtained by partially heat-treating only selvage portions of a synthetic fiber woven fabric to reduce the difference in heat shrinkage ratio between a central portion and the salvage portions and thereby suppressing slack in the selvage portions of the woven fabric. However, Patent Literature 2 assumes that the base fabric is cut one sheet by one sheet, and does not contain any discussion of cutting of a plurality of sheets, and therefore, the base fabric is not suited for cutting a plurality of sheets together at a time.

CITATION LIST

Patent Literature

Patent Literature 1: JP H7-258940A
Patent Literature 2: JP H11-48893A

SUMMARY OF INVENTION

Technical Problem

An object of the present invention is to provide an airbag base fabric having excellent low air permeability and also excellent ease of cutting with a laser, as well as an airbag.

Solution to Problem

An airbag base fabric according to the present invention is a woven fabric constituted by a yarn containing polyethylene terephthalate as a main raw material, the yarn constituting the woven fabric having a total fineness of 280 to 500 dtex and a single fiber fineness of 1.0 to 3.9 dtex, the woven fabric having a cover factor of 2400 to 2800, and a D-value calculated from a thickness $D_1$ of a single sheet of the base fabric and a thickness $D_{10}$ of ten sheets of the base fabric that are stacked together being 0.9 or less, where the D-value is calculated using a formula A below:

$$D = D_{10}/(D_1 \times 10) \tag{A}$$

In the above-described airbag base fabric, the yarn may have a single fiber diameter of 18 μm or less.

In the above-described airbag base fabric, the woven fabric may have a weave density of 57 to 72 yarns/2.54 cm in both a warp direction and a weft direction.

An airbag according to the present invention is formed of at least one of the above-described airbag base fabrics.

Advantageous Effects of the Invention

It is possible to obtain an airbag base fabric having excellent low air permeability and also excellent ease of cutting with a laser, as well as an airbag.

DESCRIPTION OF EMBODIMENTS

Figure 1:
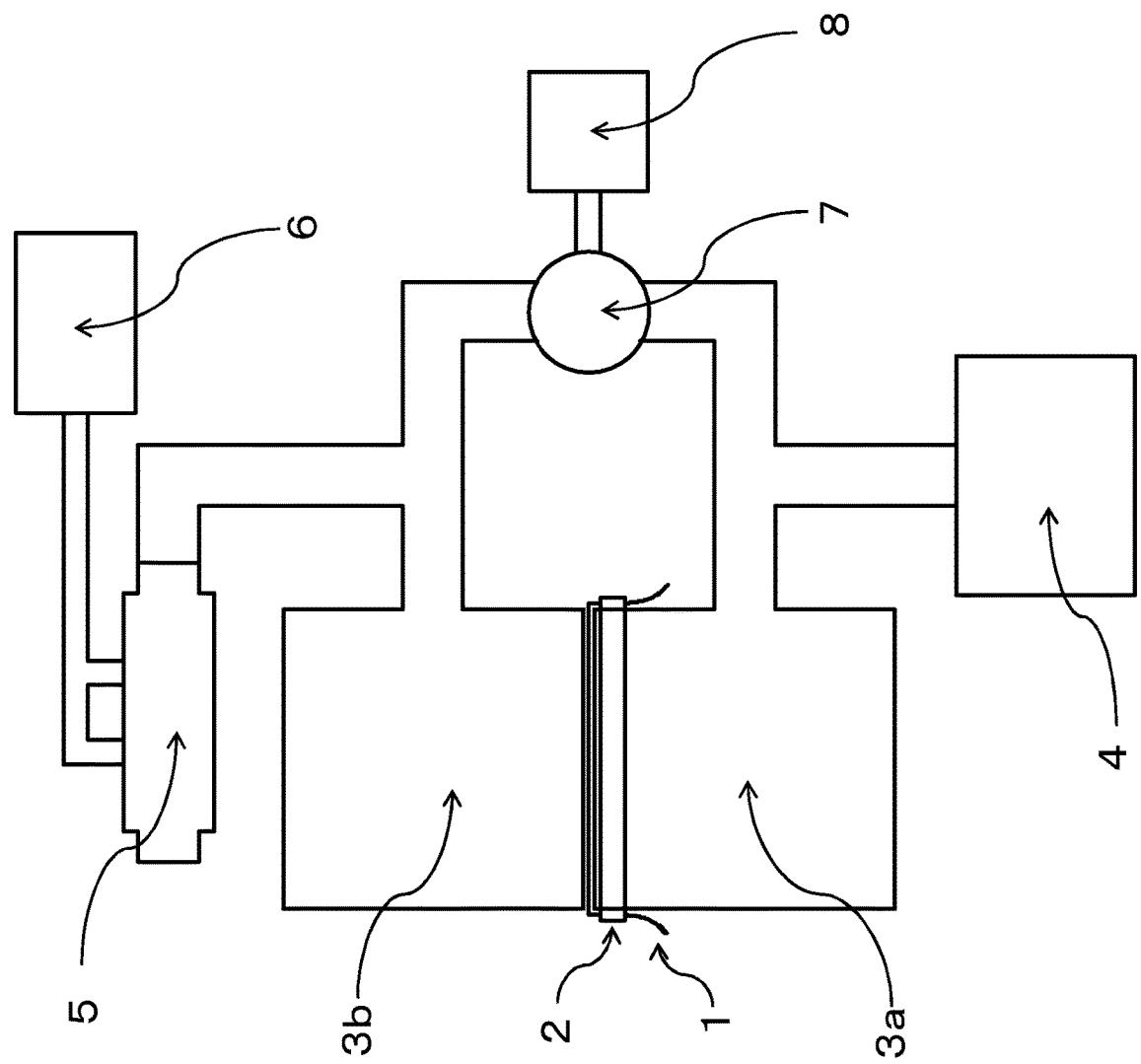
FIG. 1 schematically shows an apparatus for measuring air permeability of a raw fabric, used in Examples.

An airbag base fabric is a woven fabric constituted by a yarn containing polyethylene terephthalate as the main raw material, the yarn constituting the woven fabric having a total fineness of 280 to 500 dtex and a single fiber fineness of 1.0 to 3.9 dtex, the woven fabric having a cover factor of 2400 to 2800, and a D-value calculated from the thickness $D_1$ of a single sheet of the base fabric and the thickness $D_{10}$ of ten sheets of the base fabric that are stacked together being 0.9 or less, where the D-value is calculated using a formula A below:

$$D = D_{10}/(D_1 \times 10) \qquad \text{Formula A:}$$

It is important that this base fabric is constituted by a yarn containing polyethylene terephthalate as the main raw material. When polyethylene terephthalate is used as the main raw material, the yarn can be quickly melted when irradiated with a laser, and thus, a base fabric having excellent ease of laser cutting can be obtained.

Also, it is important that the yarn constituting the woven fabric has a total fineness of 500 dtex or less. When the yarn has a total fineness of 500 dtex or less, an excessively large amount of energy is unnecessary during cutting, and thus, a base fabric having excellent ease of laser cutting can be obtained. On the other hand, there is a yarn in which the fiber stiffness increases with an increase in the total fineness, and it is considered that an increase in the fiber stiffness results in an increase in surface roughness of the woven fabric, and the surface (in particular, portions near crests of undulations of weaving yarns) of the woven fabric becomes unlikely to deform. It is considered that this results in an increase in the D-value, which will be described later. Therefore, it is preferable that the total fineness is 280 dtex or more, and this is also because a strength required for an airbag can be obtained.

Also, it is important that the single fiber fineness of the yarn constituting the woven fabric is in a range of 1.0 to 3.9 dtex. When the single fiber fineness is 3.9 dtex or less, the occurrence of a cutting defect caused by insufficient melting of filaments located at positions far from a laser-irradiated area during cutting can be prevented. Moreover, the smaller the single fiber fineness is, the smaller the D-value, which will be described next, can be made. It is considered that the energy loss of the laser beam can thereby be reduced, and the ease of cutting improves accordingly. On the other hand, when the single fiber fineness is 1.0 dtex or more, the occurrence of fuzzing that has an influence on weaving can be suppressed.

Moreover, in order to improve the ease of cutting of the base fabric, it is important that the D-value that is the ratio of a tenfold value of the thickness $D_1$ of a single sheet of the base fabric to the thickness $D_{10}$ of ten sheets of the base fabric that are stacked together is 0.9 or less. Here, the thicknesses are measured in accordance with method A in JIS L 1096 8.4. Moreover, when measuring $D_{10}$, the base fabric sheets are stacked such that the warp directions of all the sheets are aligned in one direction, and the measurement is performed in this state. When the D-value is 0.9 or less, gaps between base fabric sheets when being cut in a stacked state are reduced, thereby allowing the energy of the laser beam to reach the lowest base fabric sheet in the stack without a loss of energy. Moreover, although there is no particular limitation on the thickness of a single sheet of the base fabric, from the viewpoint of the ease of cutting as well, the thickness of a single sheet of the base fabric is, for example, preferably 0.31 mm or less, more preferably 0.30 mm or less, and even more preferably 0.29 mm or less. On the other hand, the lower limit is, for example, preferably 0.04 mm or more, and when the thickness of the base fabric is set within the above-described range, it is easy to achieve the above-described D-value.

Moreover, if the D-value is high, this may be due to an influence of a factor such as that the fiber is hard or the undulations of the woven yarns are sharp (the surface roughness of the woven fabric is high). In this case, the air permeability may be high. On the other hand, if the D-value is low, the air permeability may be low.

In order to achieve the above-described D-value, it is necessary to, for example, reduce the thickness of the base fabric and the surface roughness of the base fabric as described above. For this purpose, the single fiber fineness of the yarn is reduced. In addition, it is considered that a reduction in the single fiber diameter of the yarn also contributes to a reduction in the D-value. The single fiber diameter is a value obtained from the single fiber fineness and the specific gravity of the yarn. For example, in the case of a yarn with a circular cross section, the single fiber diameter is obtained using a formula below. Specifically, the single fiber diameter is, for example, preferably 18 μm or less, and more preferably 16 μm or less.

[Mathematical Formula 1]

$$\text{Single fiber diameter } (\mu m) = 10 * \sqrt{\frac{\text{Single fiber fineness }(dtex)}{\text{Specific gravity }(g/cm^3) * \pi}} * 2$$

The cross-sectional shape of single fibers can be selected from a circle, an ellipse, a flattened shape, a polygon, a hollow shape, other variants, and the like. Mixed fibers, doubling yarns, combined use yarns, mixed use yarns (the warp and the weft have different cross-sectional shapes), or the like thereof can be used as needed, and the cross-sectional shape can be selected as appropriate to the extent that the spinning process and the woven fabric manufacturing process are not hindered, or the properties of the woven fabric and the like are not impaired.

It is important that the woven fabric has a cover factor of 2400 or more, preferably 2450 or more, and more preferably 2500 or more. When the cover factor is 2400 or more, gaps between weaving yarns are reduced, and excellent low air permeability can be obtained. Moreover, it is preferable that the cover factor is 2800 or less, because the flexibility of the woven fabric is unlikely to be reduced, and favorable foldability can be obtained. It is considered that, when the cover factor is increased, the absolute amount of yarn increases, and the amount of energy that is necessary for cutting per unit area of the woven fabric increases accordingly, and therefore, the ease of cutting decreases. From this viewpoint, it is preferable that the cover factor is 2600 or less. Note that, in the present invention, the cover factor (also referred to as "CF") means the value calculated using a formula below.

Cover factor (CF)=Warp density of woven fabric×√(Total fineness of warp)+Weft density of woven fabric×√(Total fineness of weft)

In terms of performance such as weavability and air permeability, it is preferable that the base fabric has a weave density of 57 to 72 yarns/2.54 cm in both the warp direction and the weft direction. In particular, it is preferable that the weave density is 57 yarns or more/2.54 cm, because the air permeability of the airbag can be reduced. From this viewpoint, the lower limit of the weave density is more preferably 60 yarns or more/2.54 cm, and even more preferably 65 yarns or more/2.54 cm.

An airbag of the present invention can be obtained by joining at least one base fabric piece obtained by cutting the above-described woven fabric into a desired shape. The woven fabric can be cut using a laser cutting machine. In this case, a plurality of sheets of the woven fabric are stacked and cut together using the laser cutting machine. In particular, if the base fabric satisfies the above-described D-value, for example, three or more sheets of the woven fabric can be stacked and cut together using a laser cutting machine (FORCUS C10 manufactured by Lectra, output: 220 W, speed: 24 m/min).

It is preferable that all of the base fabric pieces included in the airbag are formed of the above-described base fabric. The specifications, shape, and volume of the airbag can be selected in accordance with the site at which the airbag is to be arranged, the application, the storage space, the ability to absorb occupant impact, the output of an inflator, and the like. Furthermore, a reinforcing fabric and a hanging string may be added in accordance with performance requirements. The reinforcing fabric and the hanging string are preferably formed of the same base fabric as the above-described base fabric, but a coated base fabric that is different from the above-described base fabric may be chosen.

The joining of the above-described base fabric pieces, the joining of the base fabric piece and a reinforcing fabric or a hanging string, and the fixing of other cut base fabric pieces to each other are performed mainly through sewing, but it is possible to use partial adhesion, welding, or the like in combination, or use a joining method using weaving or knitting as long as the airbag has sufficient robustness, impact resistance at the time of deployment, ability to absorb occupant impact, and the like to function as an airbag.

Cut base fabric pieces can be sewn together using a sewing method that is applied to a normal airbag, such as lock stitching, multi-thread chain stitching, one side down stitching, looping, safety stitching, zigzag stitching, flattened stitching, or the like. Also, the fineness of the sewing thread can be set to 700 dtex (corresponding to #20) to 2800 dtex (corresponding to #0), and the stitch count can be set to 2 to 10 stitches/cm. If stitch lines in a plurality of rows are required, a multi-needle sewing machine with the distance between needles being about 2 mm to 8 mm can be used, but if the length of a portion to be sewn is not long, sewing may be performed a plurality of times using a single-needle sewing machine. If an airbag main body is formed using a plurality of base fabric pieces, the plurality of base fabric pieces may be sewn together in a stacked state, or may be sewn one to another.

The sewing thread used for sewing can be selected as appropriate from threads that are generally called synthetic sewing threads and threads that are used as industrial sewing threads. Examples thereof include polyamide yarns typified by nylon 6 yarns, nylon 66 yarns, and nylon 46 yarns, polyester yarns typified by polyethylene terephthalate yarns and polybutylene terephthalate yarns, macromolecular polyolefin yarns, fluorine-containing yarns, vinylon yarns, aramid yarns, carbon yarns, glass yarns, and steel yarns, and any of a spun yarn, a filament twisted yarn, and a processed filament resin yarn may be used.

Furthermore, in order to prevent gas leaking from stitches in an outer circumferential seam portion or the like, a sealing material, an adhesive or a pressure-sensitive adhesive material, or the like may be applied to, sprayed onto, or stacked on upper portions and/or lower portions of stitches, gaps between stitches, a seam allowance, or the like.

EXAMPLES

Hereinafter, the present invention will be described in greater detail based on examples, but the present invention is not limited to these examples.

Total Fineness of Yarn

Measurement was performed in accordance with method B in JIS L 1013 8.3.1.

Filament Count of Yarn

Measurement was performed in accordance with JIS L 1013 8.4.

Single Fiber Fineness

The fineness was obtained by dividing the total fineness of the yarn by the filament count of the yarn.

Weave Density of Fabric

Measurement was performed in accordance with method A in JIS L 1096 8.6.1.

D-Value

The thickness of an obtained base fabric was measured in accordance with method A in JIS L 1096 8.4, and was used as $D_1$. Furthermore, ten sheets of the base fabric were stacked such that the warp directions of the weaving yarns of the sheets were aligned in one direction, and the thickness of the sheets in this state was measured in accordance with the same method, and the measurement value was used as $D_{10}$. The D-value was calculated from $D_1$ and $D_{10}$ using the formula A:

$$D=D_{10}/(D_1\times 10) \qquad \text{Formula A:}$$

Air Permeation Amount of Base Fabric

The air permeation amount of the obtained base fabric at a differential pressure of 20 kPa was measured using a raw-fabric air-permeation-amount measuring machine (manufactured by Kyotoseiko Co., Ltd.; a flowmeter 6: DF2810P manufactured by Cosmo Instruments Co., Ltd.; a laminar flow tube 5: LF2-100L manufactured by Cosmo Instruments Co., Ltd.; and a pressure gauge 8: DP-330BA manufactured by Cosmo Instruments Co., Ltd.) shown in FIG. 1. The obtained woven fabric was cut into a size of 20 cm×20 cm and used as a sample. The sample was fixed to a circular cylindrical clamp 3a with a ring-shaped fastener 2, the circular cylindrical clamp 3a being connected to a pressure device and having an inner diameter of 50 mm, and was held between the circular cylindrical clamp 3a and a circular cylindrical clamp 3b connected to the laminar flow tube 5 and having an inner diameter of 50 mm. After that, pressure was applied from the circular cylindrical clamp 3a side, and a pressure regulating valve 7 was operated such that the pressure gauge 8 indicated 20 kPa. In the above-described state, the amount of air passing through the sample was detected using the laminar flow tube 5 and taken as the air permeation amount at a differential pressure of 20 kPa. It can be said that, when the air permeation amount was 1.0 L/cm$^2$·min or less, the air permeation amount from the surface of the base fabric was low.

Test for Checking Stich Opening Amount

Figure 2:
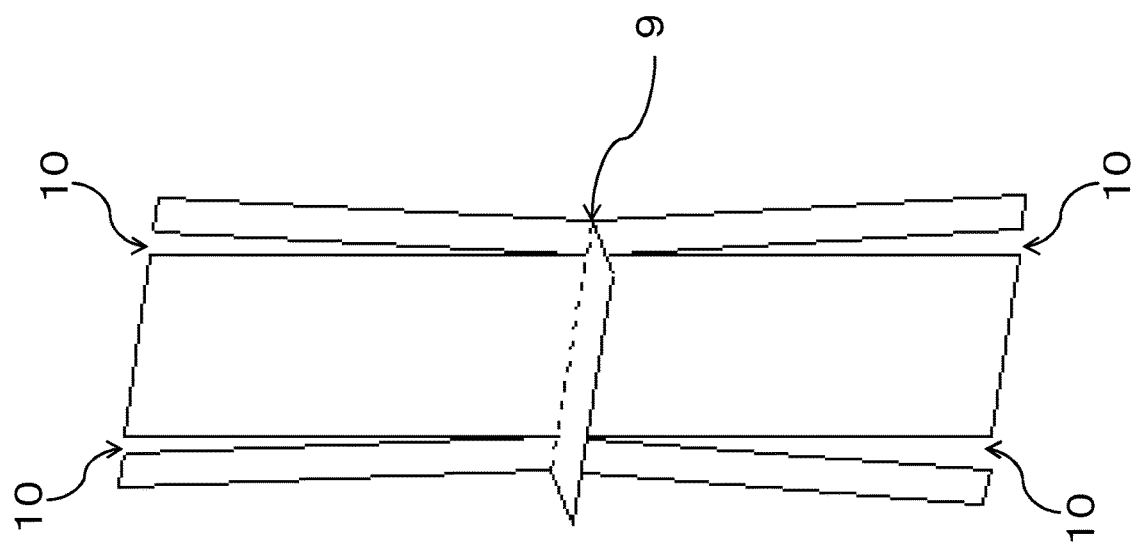
FIG. 2 schematically shows a sample for evaluation of a stitch opening amount, used in Examples.

A sample such as that shown in FIG. 2 was prepared. That is to say, two test pieces with a width of 70 mm and a length of 150 mm were cut such that the lengthwise directions of the test pieces matched the warp direction of the weaving yarns of the base fabric. The test pieces were stacked such that their long sides were oriented in the same direction, and were sewn together along one short edge with a seam allowance of 20 mm and a stitch count of 3.5 stitches/10 mm using a sewing thread (machine thread for air bags, fineness: 1400 dtex, manufactured by Gunze Limited). After the sewing, slits 10 were cut into the test pieces from the short side edges that were not sewn to the sewn portion denoted by reference numeral 9, along the respective long side edges while leaving areas of 20 mm wide from the respective long side edges, to obtain a sample for a test for checking the stitch opening amount as shown in FIG. 2. A central strip portion (portion with a width of 30 mm) of the sample was opened out along the sewn portion 9, two ends of the opened sample were clamped on a measuring apparatus (model: AG-IS MO, manufactured by Shimadzu Corporation), and a load of 490 N was applied. With the load applied, the widening length of the stitches was measured and recorded. Also, measurement was performed in the same manner with respect to test pieces that were cut such that the lengthwise directions of the test pieces matched the weft direction of the weaving yarns of the base fabric. It can be said that, if the average of the stitch widening amounts in the warp direction and the weft direction was less than 1.2 mm, the air permeation amount from the sewn portion was small.

Test for Ease of Cutting

Figure 3:
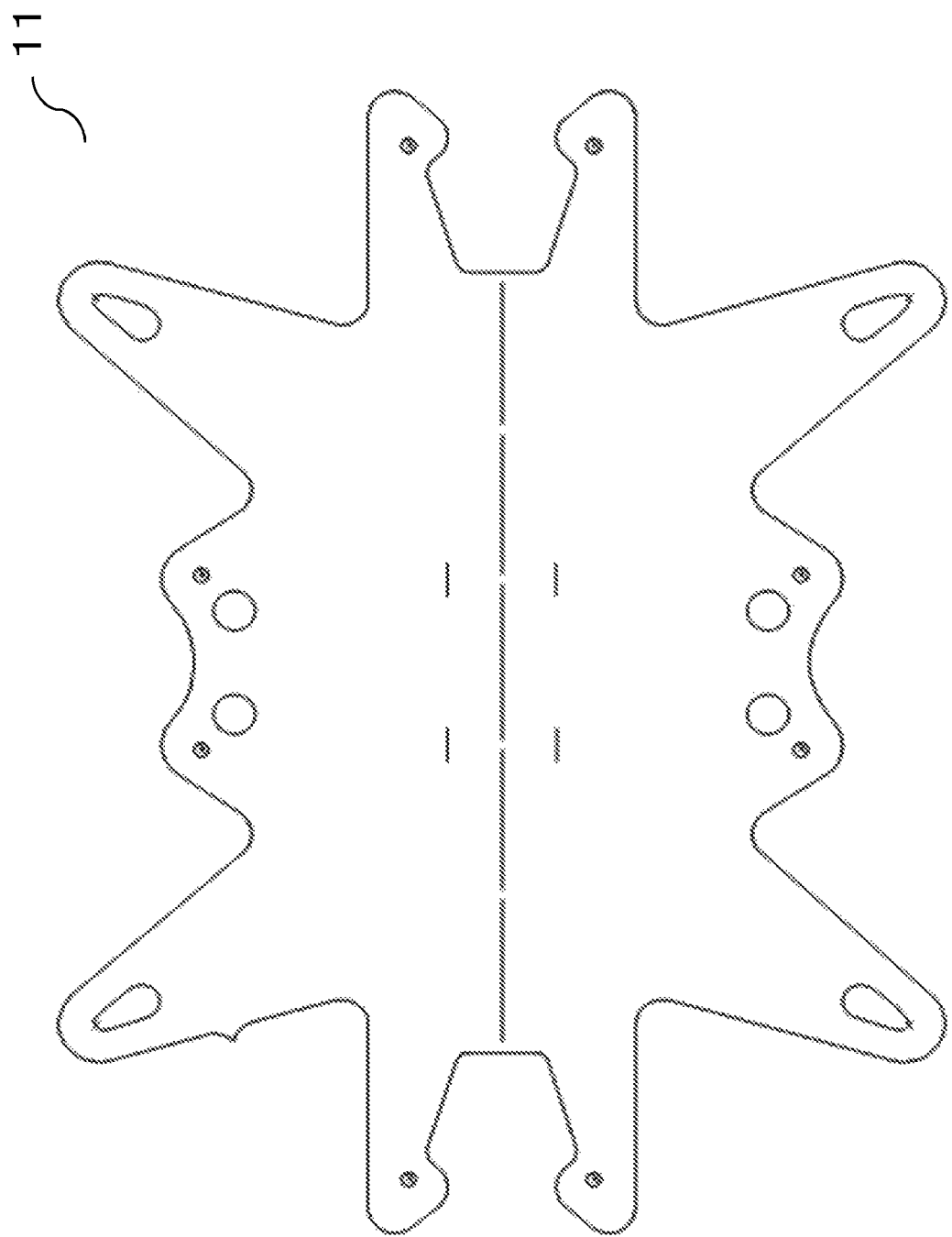
FIG. 3 schematically shows a sample for a test of the ease of cutting, used in Examples.

Six sheets of the obtained base fabric were stacked such that the warp directions of the weaving yarns of the sheets were aligned in one direction. The stacked sheets of the base fabric were referred to as the first sheet, the second sheet, . . . , and the sixth sheet in ascending order from the top. In a state in which the six sheets of the base fabric were stacked in this manner, parts 11 with a shape shown in FIG. 3 were cut out using a laser cutting machine (FORCUS C10 manufactured by Lectra, output: 220 W, speed: 24 m/min). After the cutting, the conditions of the cut parts respectively obtained from the first to sixth sheets were checked, and a cut part that was perfectly cut was given 5 points, a cut part in which a portion of the cutting surface fused and remained was given 4 points, a cut part in which an uncut portion, such as an uncut filament, was observed on a portion of the cutting surface was given 3 points, a cut part in which a portion of the cutting line was not completely melted and remained was given 2 points, a cut part in which the cutting line was not completely melted over the entire length thereof was given 1 point, and a cut part that was not reached by the laser was given 0 points. The sum of the points for the cut parts obtained from the first to sixth sheets was calculated, and if the sum was 24 points or more, the base fabric was evaluated as having extremely excellent ease of cutting; if the sum was 22 points or more, the base fabric was evaluated as having excellent ease of cutting; and if the sum was less than 22 points, the base fabric was evaluated as having poor ease of cutting. Moreover, with regard to the evaluation of the cutting surfaces of the sheets of the base fabric, 4 points or more was preferable, and the acceptable lower limit was 3 points.

Hereinafter, examples and comparative examples, as well as evaluation thereof will be described using Table 1.

Example 1

A plain woven fabric was produced using a polyethylene terephthalate yarn having a total fineness of 330 dtex, a filament count of 144 filaments, and a single fiber fineness of 2.29 dtex, and scouring and setting were performed to obtain an airbag base fabric having a weave density of 70 yarns/2.54 cm in both the warp direction and the weft direction and a D-value of 0.89. This base fabric had an air permeation amount of 0.56 L/cm$^2$·min and a stitch opening amount of 0.88 mm. Therefore, there was little probability of gas leakage from both the base fabric surface and the stitches, and the base fabric had sufficient performance for achieving the airtightness required for an airbag. Moreover, as a result of the test for the ease of cutting, the total score was as high as 26 points, and cutting was sufficiently performed up to the fifth sheet. Therefore, the base fabric had extremely excellent ease of cutting.

Example 2

A plain woven fabric was produced using a polyethylene terephthalate yarn having a total fineness of 470 dtex, a filament count of 182 filaments, and a single fiber fineness of 2.58 dtex, and scouring and setting were performed to obtain an airbag base fabric having a weave density of 57 yarns/2.54 cm in both the warp direction and the weft direction and a D-value of 0.87. This base fabric had an air permeation amount of 0.68 L/cm$^2$·min and a stitch opening amount of 1.14 mm. Therefore, there was little probability of gas leakage from both the base fabric surface and the stitches, and the base fabric had sufficient performance for achieving the airtightness required for an airbag. Moreover, as a result of the test for the ease of cutting, the total score was as high as 24 points, and cutting was sufficiently performed up to the fourth sheet. Therefore, the base fabric had extremely excellent ease of cutting.

Example 3

A plain woven fabric was produced using a polyethylene terephthalate yarn having a total fineness of 470 dtex, a filament count of 144 filaments, and a single fiber fineness of 3.26 dtex, and scouring and setting were performed to obtain an airbag base fabric having a weave density of 57 yarns/2.54 cm in both the warp direction and the weft direction and a D-value of 0.86. This base fabric had an air permeation amount of 0.79 L/cm$^2$·min and a stitch opening amount of 0.95 mm. Therefore, there was little probability of gas leakage from both the base fabric surface and the stitches, and the base fabric had sufficient performance for achieving the airtightness required for an airbag. Moreover, as a result of the test for the ease of cutting, the total score was as high as 22 points, and cutting was sufficiently performed up to the fourth sheet. Therefore, the base fabric had excellent ease of cutting.

Example 4

A plain woven fabric was produced using a polyethylene terephthalate yarn having a total fineness of 330 dtex, a filament count of 144 filaments, and a single fiber fineness of 2.29 dtex, and scouring and setting were performed to obtain an airbag base fabric having a weave density of 67 yarns/2.54 cm in both the warp direction and the weft direction and a D-value of 0.88. This base fabric had an air permeation amount of 0.81 L/cm$^2$·min and a stitch opening amount of 0.90 mm. Therefore, there was little probability of gas leakage from both the base fabric surface and the stitches, and the base fabric had sufficient performance for achieving the airtightness required for an airbag. Moreover, as a result of the test for the ease of cutting, the total score was as high as 26 points, and cutting was sufficiently performed up to the fifth sheet. Therefore, the base fabric had excellent ease of cutting. Note that, compared with Example 1, the cover factor was somewhat low, and accordingly, the air permeability was somewhat high.

Example 5

A plain woven fabric was produced using a polyethylene terephthalate yarn having a total fineness of 470 dtex, a filament count of 182 filaments, and a single fiber fineness of 2.58 dtex, and scouring and setting were performed to obtain an airbag base fabric having a weave density of 57 yarns/2.54 cm in both the warp direction and the weft direction and a D-value of 0.83. This base fabric had an air permeation amount of 0.65 L/cm$^2$·min and a stitch opening amount of 1.18 mm. Therefore, there was little probability of gas leakage from both the base fabric surface and the stitches, and the base fabric had sufficient performance for achieving the airtightness required for an airbag. Moreover, as a result of the test for the ease of cutting, the total score was as high as 25 points, and cutting was sufficiently performed up to the fifth sheet. Therefore, the base fabric had excellent ease of cutting. Note that, compared with Example 2, the D-value was low, and accordingly, the air permeability was somewhat low.

Comparative Example 1

A plain woven fabric was produced using a polyethylene terephthalate yarn having a total fineness of 470 dtex, a filament count of 182 filaments, and a single fiber fineness of 2.58 dtex, and scouring and setting were performed to obtain an airbag base fabric having a weave density of 55 yarns/2.54 cm in both the warp direction and the weft direction and a D-value of 0.87. As a result of the test for the ease of cutting, the total score was as high as 24 points, and cutting was sufficiently performed up to the fourth sheet. Therefore, the base fabric had extremely excellent ease of cutting. However, this base fabric had an air permeation amount of 1.48 L/cm²·min and a stitch opening amount of 1.25 mm. Therefore, there was high probability of gas leakage from both the base fabric surface and the stitches, and the base fabric did not have sufficient performance for achieving the airtightness required for an airbag. It was considered that the reason for this was the low cover factor.

Comparative Example 2

A plain woven fabric was produced using a polyethylene terephthalate yarn having a total fineness of 550 dtex, a filament count of 144 filaments, and a single fiber fineness of 3.82 dtex, and scouring and setting were performed to obtain an airbag base fabric having a weave density of 52 yarns/2.54 cm in both the warp direction and the weft direction and a D-value of 0.92. This base fabric had an air permeation amount of 1.05 L/cm²·min and a stitch opening amount of 1.04 mm. Therefore, there was somewhat high probability of gas leakage from both the base fabric surface and the stitches, and the base fabric did not have sufficient performance for achieving the airtightness required for an airbag. It was considered that the reason for this was the somewhat low cover factor. Moreover, it was also considered that, due to the high total fineness, weaving a high-density fabric was difficult, and consequently, the air permeability was high. Moreover, it was considered that the high D-value was due to the large single fiber diameter of the yarn. Accordingly, as a result of the test for the ease of cutting, the total score was 21 points, and the base fabric had poor ease of cutting.

Comparative Example 3

A plain woven fabric was produced using a polyethylene terephthalate yarn having a total fineness of 470 dtex, a filament count of 144 filaments, and a single fiber fineness of 3.26 dtex, and scouring and setting were performed to obtain an airbag base fabric having a weave density of 57 yarns/2.54 cm in both the warp direction and the weft direction and a D-value of 0.91. This base fabric had an air permeation amount of 1.10 L/cm²·min and a stitch opening amount of 0.93 mm. Therefore, even though the cover factor was not low, there was somewhat high probability of gas leakage from the base fabric surface, and the base fabric did not have sufficient performance for achieving the airtightness required for an airbag. It was considered that the reason for this was the high D-value resulting from the large single fiber diameter of the yarn. Accordingly, as a result of the test for the ease of cutting, the total score was 21 points, and the base fabric had poor ease of cutting.

Comparative Example 4

A plain woven fabric was produced using a nylon 66 yarn having a total fineness of 470 dtex, a filament count of 144 filaments, and a single fiber fineness of 3.26 dtex, and scouring and setting were performed to obtain an airbag base fabric having a weave density of 53 yarns/2.54 cm in both the warp direction and the weft direction and a D-value of 0.92. This base fabric had an air permeation amount of 0.27 L/cm²·min and a stitch opening amount of 1.19 mm. Therefore, there was little probability of gas leakage from the base fabric surface and the sewn portion, and the base fabric had sufficient performance for achieving the airtightness required for an airbag. However, as a result of the test for the ease of cutting, the total score was as extremely low as 16 points, and the base fabric had poor ease of cutting. It was considered that the reason for this was that, since nylon was used as the material, the yarn had a large single fiber diameter, and accordingly, the D-value was high.

TABLE 1

| | | | Ex. 1 | Ex. 2 | Ex. 3 | Ex. 4 | Ex. 5 | Com. Ex. 1 | Com. Ex. 2 | Com. Ex. 3 | Com. Ex. 4 |
|---|---|---|---|---|---|---|---|---|---|---|---|
| Type of fiber | | | PET | PET | PET | PET | PET | PET | PET | PET | PA66 |
| Total fineness | dtex | | 330 | 470 | 470 | 330 | 470 | 470 | 550 | 470 | 470 |
| Filament count | filaments | | 144 | 182 | 144 | 144 | 182 | 182 | 144 | 144 | 144 |
| Single fiber fineness | dtex | | 2.29 | 2.58 | 3.26 | 2.29 | 2.58 | 2.58 | 3.82 | 3.26 | 3.26 |
| Single fiber diameter | mm | | 0.0145 | 0.0154 | 0.0174 | 0.0145 | 0.0154 | 0.0154 | 0.0188 | 0.0174 | 0.0191 |
| Density | yarns/2.54 cm | Warp | 70 | 57 | 57 | 67 | 57 | 55 | 52 | 57 | 53 |
| | | Weft | 70 | 57 | 57 | 67 | 57 | 55 | 52 | 57 | 53 |
| CF | — | | 2543 | 2471 | 2471 | 2434 | 2471 | 2385 | 2439 | 2471 | 2298 |
| $D_1$ | mm | | 0.244 | 0.290 | 0.300 | 0.240 | 0.298 | 0.287 | 0.311 | 0.303 | 0.310 |
| $D_{10}$ | mm | | 2.18 | 2.52 | 2.58 | 2.12 | 2.47 | 2.49 | 2.86 | 2.76 | 2.85 |
| D-value | — | | 0.89 | 0.87 | 0.86 | 0.88 | 0.83 | 0.87 | 0.92 | 0.91 | 0.92 |
| Air permeation amount | L/cm² · min | | 0.42 | 0.68 | 0.79 | 0.81 | 0.65 | 1.48 | 1.05 | 1.10 | 0.27 |
| Stitch opening | mm | Warp | 0.82 | 1.11 | 0.93 | 0.85 | 1.15 | 1.22 | 1.03 | 0.92 | 1.10 |
| | | Weft | 0.93 | 1.17 | 0.96 | 0.94 | 1.20 | 1.28 | 1.05 | 0.93 | 1.27 |
| | | Average | 0.88 | 1.14 | 0.95 | 0.90 | 1.18 | 1.25 | 1.04 | 0.93 | 1.19 |
| Cutting stability | First sheet | | 5 | 5 | 5 | 5 | 5 | 5 | 5 | 5 | 5 |
| | Second sheet | | 5 | 5 | 5 | 5 | 5 | 5 | 5 | 5 | 5 |
| | Third sheet | | 5 | 5 | 5 | 5 | 5 | 5 | 5 | 5 | 4 |
| | Fourth sheet | | 5 | 4 | 4 | 5 | 4 | 4 | 3 | 3 | 2 |
| | Fifth sheet | | 4 | 3 | 2 | 4 | 3 | 3 | 2 | 2 | 0 |
| | Sixth sheet | | 2 | 2 | 1 | 2 | 3 | 2 | 1 | 1 | 0 |
| | Total | | 26 | 24 | 22 | 26 | 25 | 24 | 21 | 21 | 16 |

LIST OF REFERENCE NUMERALS

1 Sample for measurement of air permeability
2 Ring-shaped fastener
3a, 3b Circular cylindrical clamp
4 Pressure device
5 Laminar flow tube
6 Flowmeter
7 Pressure regulating valve
8 Pressure gauge
9 Sewn portion
10 Slit
11 Part for cutting test

The invention claimed is:

1. An airbag base fabric that is a woven fabric constituted by a yarn containing polyethylene terephthalate as a main raw material,
the yarn constituting the woven fabric having:
a total fineness of 280 to 500 dtex, and
a single fiber fineness of 1.0 to 2.58 dtex,
the woven fabric having a cover factor of 2400 to 2800, and
a D-value calculated from a thickness $D_1$ of a single sheet of the base fabric and a thickness $D_{10}$ of ten sheets of the base fabric that are stacked together being 0.9 or less, where the D-value is calculated using a formula A below:

$$D = D_{10}/(D_1 \times 10) \tag{A}$$

2. The airbag base fabric according to claim 1, wherein the yarn has a single fiber diameter of 18 μm or less.

3. The airbag base fabric according to claim 1, wherein the woven fabric has a weave density of 57 to 72 yarns/2.54 cm in both a warp direction and a weft direction.

4. An airbag formed of at least the airbag base fabric according to claim 1.

5. An airbag base fabric that is a woven fabric constituted by a yarn containing polyethylene terephthalate as a main raw material,
the yarn constituting the woven fabric having:
a total fineness of 280 to 500 dtex, and
a single fiber fineness of 1.0 to 3.9 dtex,
the woven fabric having a cover factor of 2400 to 2800, and
a D-value calculated from a thickness $D_1$ of a single sheet of the base fabric and a thickness $D_{10}$ of ten sheets of the base fabric that are stacked together being 0.9 or less, where the D-value is calculated using a formula A and B below:

$$D = D_{10}/(D_1 \times 10) \tag{A}$$

$$0.04 \text{ mm} < D_1 < 0.29 \text{ mm} \tag{B}$$

* * * * *